Jan. 31, 1933.　　　F. W. MACLENNAN　　　1,895,468
CLASSIFIER
Filed Oct. 17, 1929　　2 Sheets-Sheet 1

INVENTOR
Frank W. Maclennan
BY
Hoguet & Neary
ATTORNEYS

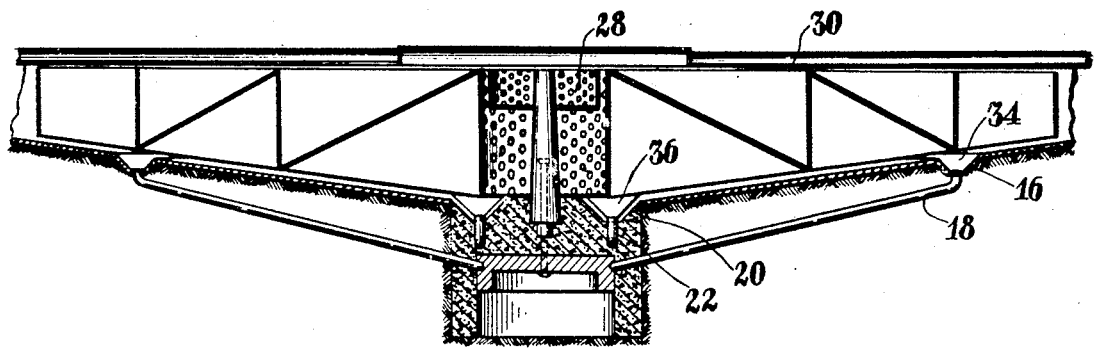
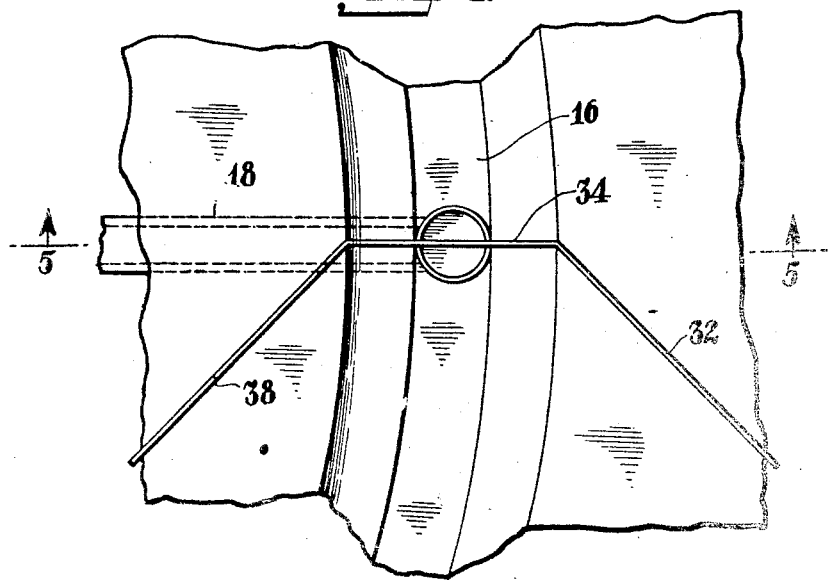
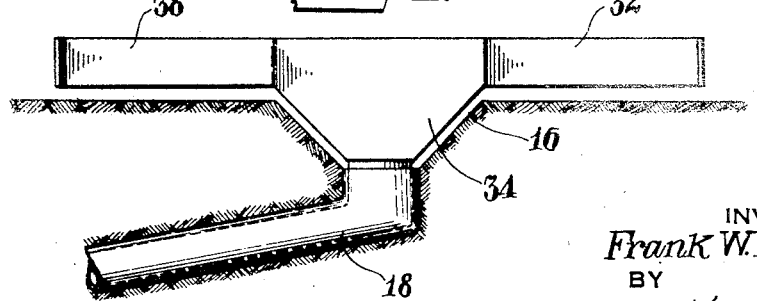

Patented Jan. 31, 1933

1,895,468

UNITED STATES PATENT OFFICE

FRANK W. MACLENNAN, OF MIAMI, ARIZONA

CLASSIFIER

Application filed October 17, 1929. Serial No. 400,194.

My invention relates to improvements in classifiers and more particularly to apparatus for the classification of finely divided solids in slime pulp.

A known form of apparatus for thickening the solids of a slime pulp and recovering clear water therefrom consists of a relatively shallow tank of large horizontal area and with a slightly conical bottom, a central feed well, a peripheral overflow launder and a slow moving mechanism, suitably supported, carrying rake arms near the bottom of the tank that serve by their revolution to move settled solids to a central bottom discharge opening. It has been found in the operation of such thickeners that solids in the pulp fed thereto settle on the conical bottom of the tank according to their size, the larger particles nearer the center of the tank and smaller particles nearer the periphery of the tank. For example, in the operation of a thickener 325 feet in diameter fed with a pulp whose solids have been ground to pass a 48-mesh sieve, it has been found that the plus 100 mesh material will settle in the central area whose diameter is 64 feet, the minus 100 mesh plus 200 mesh material will settle in the annular area whose inside diameter is 64 feet and whose outside diameter is 126 feet, and the minus 200 mesh material will settle in the annular area whose inside diameter is 126 feet and whose outside diameter is the diameter of the tank.

Heretofore no advantage has been taken of this sorting action on the solids of the pulp, as the act of raking the solids to the central discharge restores the size distribution to that of the original feed.

It is the object of the present invention to provide means for extracting the thickened solids from such a tank in any number of different sizes as desired.

The above and other objects, all of which appear in the course of the following description, I attain by the features of construction and arrangement shown in the accompanying drawings:

Fig. 3 is a partial, enlarged, sectional elevation taken on line 3—3 of Fig. 1.

Fig. 4 is an enlarged plan of the slime trench and rake.

Fig. 5 is a sectional elevation taken on line 5—5 of Fig. 4 with the rake shown in a position where it is approaching the discharge conduit.

Figure 1:
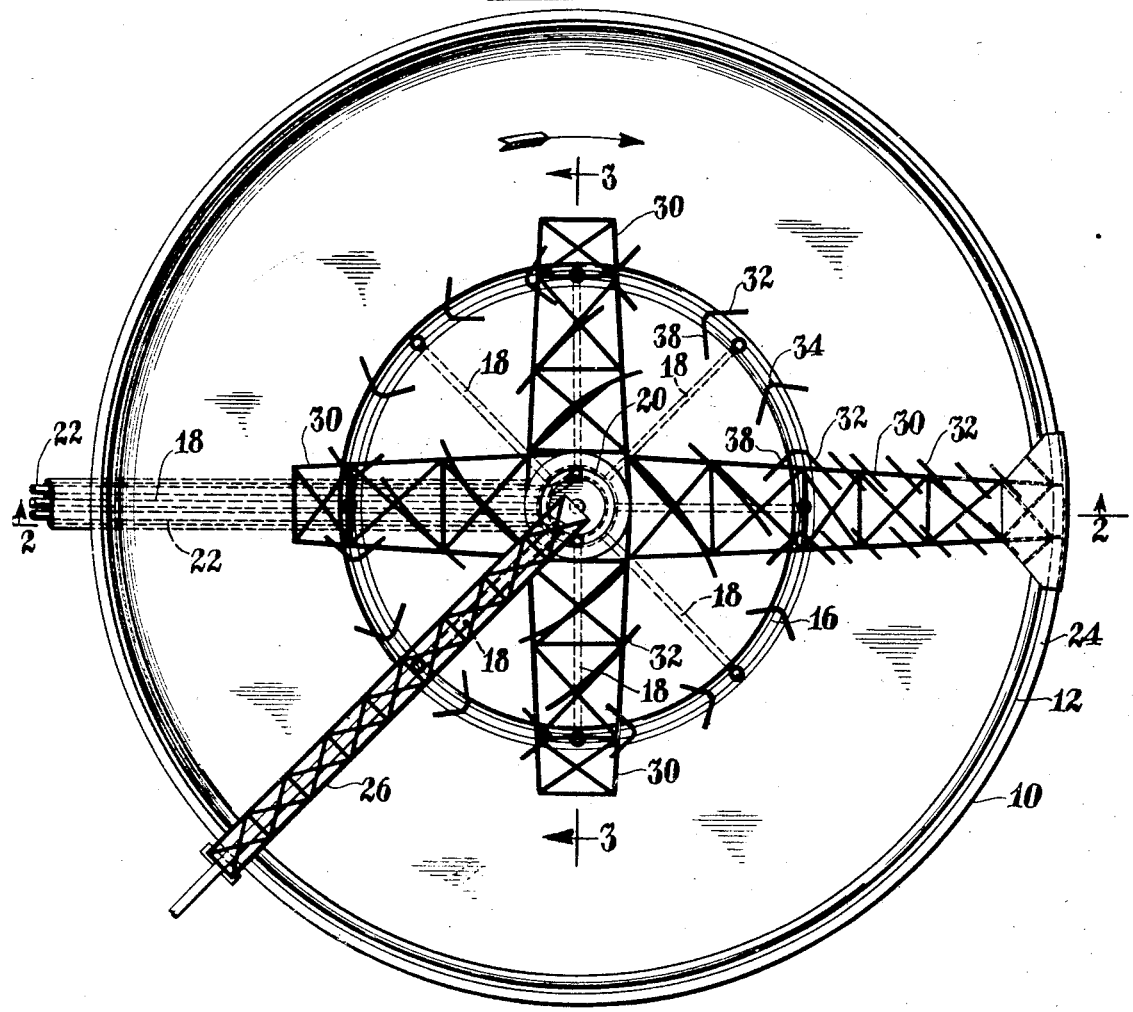
Fig. 1 is a plan view of a thickening tank equipped with my classifying and extracting device.
Figure 2:
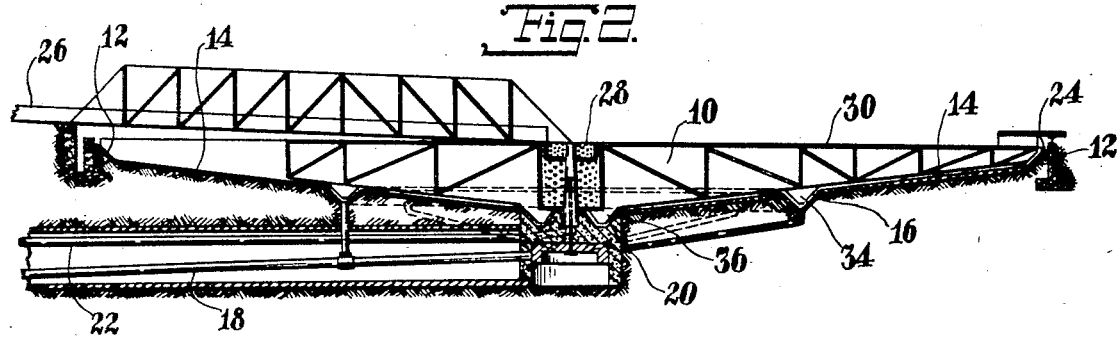
Fig. 2 is a sectional elevation taken on line 2—2 of Fig. 1.

The setling tank 10 consists of a circular inclined side wall 12 and a bottom surface 14 slightly sloping from said side wall to the center of the tank. An annular trough or well 16 is connected with conduits 18, through which the material settling on the annular area bounded by the side wall 12 and the trough 16 is discharged. Another annular trough 20, positioned about the base of the feed well at the center of the tank, is connected with conduits 22 through which the material settling on the annular area bounded by the trough 16 and the trough 20 is discharged. A circumferential launder 24 formed at the upper edge of the tank provides an overflow for the liquid rising out of the solids which settle upon the bottom of the tank. A suitably disposed conduit conveys this liquid to a storage receptacle.

The pulp to be treated in the thickener is fed through the launder 26 into a central feed well 28.

The rake arms 30, suitably supported at the center and at the periphery of the tank, are rotated slowly about the center of the tank by any suitable mechanism.

The rake arms 30 are provided with a plurality of scrapers 32, adapted to propel the settled material along the sloping bottom of the tank toward the discharge troughs 16 and 20. The scrapers 34 and 36, suitably attached to the rake arms, project into the troughs 16 and 20 and serve to prevent adherence of the settled material to the sides of the troughs and to propel the material to the exit conduits 18 and 22. The scrapers 38 are attached to the rake arms 30 substantially at right angles to the scrapers 32. This change in direction of the scraper 38 is for the purpose of restraining the material from passing over the trough 16 and continuing down to the center of the tank.

The drawings show the tank equipped for making two products of different degrees of fineness. It will be understood, however, that a number of troughs may be placed in the tank and a corresponding number of sized products produced.

I claim:

1. A classifier comprising a shallow settling container having an extended bottom area upon which settled solids may collect and rest by gravity, a liquid overflow launder and a feed well associated therewith, said launder and feed well being so spaced that liquid introduced to the container through said feed well follows a generally horizontal path to the launder of such length as to permit settling out of solids carried thereby and their collection upon the bottom of said container, means in the bottom of said container at spaced points between said feed well and said launder for separately withdrawing solids so settling, means for leading the portions of material so withdrawn to separate places of collection, and scraping means movable over the bottom for moving settled solids to said first-mentioned means.

2. A classifier comprising a shallow settling container, a liquid overflow launder and a feed well associated therewith, said launder and feed well being so spaced that liquid introduced to the container through said feed well follows a generally horizontal path to the launder of such length as to permit settling out of solids carried thereby, a plurality of troughs in the bottom of said container at different distances from said launder, discharge conduits connected with said troughs, scraping means for moving settled solids to said troughs, and scraping means for moving said solids along said troughs to the discharge conduits.

3. A classifier comprising a shallow settling container, having a liquid overflow launder adjacent to the side walls and a sloping bottom, means for introducing a slime pulp at a point remote from the side walls, scraping means for moving solids that settle to the bottom toward the center of the container, and means at differently spaced distances from the side walls for separately withdrawing and collecting portions of said solids that settle upon portions of the bottom disposed at differently spaced distances from the side walls.

4. A classifier comprising a shallow circular container, a peripherally disposed overflow launder, a central feed well and means including scraping means for separately and simultaneously withdrawing material collecting upon different annular portions of the container bottom and for leading the portions of material so withdrawn to separate places of collection.

5. A classifier comprising a shallow circular container, a peripherally disposed overflow launder, a central feed well, a plurality of annular troughs disposed in the bottom of said container at spaced distances between the feed well and the overflow launder, separate discharge conduits connected to the respective troughs and scraping means for moving solids collected upon the bottom to said troughs and along the troughs to the discharge conduits.

6. A classifier comprising a settling container having a peripherally disposed liquid overflow launder and a slightly inverted conical bottom, a central feed well, a rotary member carrying scraping means for moving solids that settle to the bottom toward the center of the container, and means for separately withdrawing said solids collecting upon different annular portions of the container bottom and leading the solids so withdrawn to separate places of collection.

7. In a classifier, a shallow settling container, spaced troughs in the bottom of said container, scraping means movable over the bottom of said container to move settled solids to said troughs, and means moving in said troughs for removing said solids therefrom and leading them to separate places of collection.

8. In a classifier, a shallow circular settling container, spaced annular troughs formed in the bottom of said container, an arm rotatably mounted in said container and carrying scraping means for moving solids that settle to the bottom toward and into said troughs, and separate means carried by said arm and moving in said troughs to remove said solids therefrom.

In testimony whereof, I have signed my name to this specification this tenth day of October, 1929.

FRANK W. MACLENNAN.